United States Patent [19]

Saam et al.

[11] Patent Number: 4,482,670

[45] Date of Patent: Nov. 13, 1984

[54] METHOD OF POLYMERIZING POLYDIORGANOSILOXANE FLUID-FILLER MIXTURE USING SULFURIC OR SULFONIC ACIDS

[75] Inventors: John C. Saam, Midland; James R. Falender, Sanford, both of Mich.

[73] Assignee: Dow Corning Corporation, Midland, Mich.

[21] Appl. No.: 474,918

[22] Filed: Mar. 14, 1983

[51] Int. Cl.$^3$ ............................................. C08L 83/04
[52] U.S. Cl. .................................... 524/860; 524/862; 524/863; 524/847; 524/493; 528/23; 528/24; 528/33; 528/37
[58] Field of Search ...................... 528/23, 24, 33, 37; 524/493, 847, 862, 863, 860

[56] References Cited

U.S. PATENT DOCUMENTS 2,469,883  5/1949  Marsden et al. ................... 260/46.5
3,078,255  2/1963  Pike ..................................... 260/46.5
3,294,725 12/1966  Findlay et al. ....................... 524/745

FOREIGN PATENT DOCUMENTS 1325654  8/1973  United Kingdom .

*Primary Examiner*—Melvyn I. Marquis
*Attorney, Agent, or Firm*—Edward C. Elliott

[57] ABSTRACT

A method of polymerizing an oligomer comprising a polydiorganosiloxane, polydiorganocyclosiloxane, or mixture thereof in the presence of reinforcing filler using a catalytic amount of sulfuric or sulfonic acid is described. The sulfonic acid is of the formula $XSO_3H$ wherein X is selected from the group consisting of halogen, alkyl, aryl, alkoxy, and alkaryl radicals. The dispersion of reinforcing filler in polydiorganosiloxane is produced using less energy, with fewer manufacturing steps than current commerical processes. The silicone polymer-filler mixture produced by this method is useful as electrical insulation compounds, in greases, and in producing curable compositions useful as sealants, caulking compounds, and heat curable silicone elastomeric compositions.

21 Claims, No Drawings

METHOD OF POLYMERIZING POLYDIORGANOSILOXANE FLUID-FILLER MIXTURE USING SULFURIC OR SULFONIC ACIDS

BACKGROUND OF THE INVENTION

1. Field of the Invention

This invention relates to the polymerization of hydroxyl-endblocked polydimethylsiloxane fluid and of polydiorganocyclosiloxane fluid in the presence of reinforcing filler using sulfuric acid or sulfonic acid as catalysts.

2. Description of the Prior Art

Marsden and Roedel, in U.S. Pat. No. 2,469,883, issued May 10, 1949, claim a process of preparing a solid, elastic, curable dimethylpolysiloxane by treating a liquid dimethylpolysiloxane with sulfuric acid or chlorosulfonic acid, then removing the acidic material after the solid, elastic product is formed. The product was further processed by mixing with filler and organic peroxide.

Buchner et al., in British Pat. No. 1,325,654, issued Aug. 8, 1973, disclose a process for manufacture of a mixture of high molecular weight linear organopolysiloxane with an acidic or neutral filler. They mix together a low molecular weight diorganocyclosiloxane, at least 0.05 percent of the weight of the siloxane of anhydrous perfluoroalkane sulfonic acid and filler. A low molecular weight triorganosiloxy-endblocked linear polydiorganosiloxane may also be present. After polymerization at a temperature below 50° C., the mixture is neutralized with a basic substance. They teach that higher temperatures are disadvantageous in that polymerization only reaches a moderate degree, for example, up to an oil of about 1000 centipoise, if the initiator is neutralized at the temperature employed. They further teach that if the neutralization before cooling is omitted, an unusable gel is obtained.

Pike, in U.S. Pat. No. 3,078,255, issued Feb. 19, 1963, discloses a process for condensing hydroxyl-endblocked organosilicon compounds in the presence of a catalyst consisting of arylsulfonic acids or sulfonalkanoic acids, each containing no more than 18 carbon atoms.

Findlay and Weyenberg disclose in U.S. Pat. No. 3,294,725, issued Dec. 27, 1966, the polymerization of organosiloxanes in an aqueous medium using a surface active sulfonic acid as catalyst.

SUMMARY OF THE INVENTION

A method has been developed to bulk polymerize oligomer in the presence of reinforcing filler. The reinforcing filler is dispersed in the oligomer while it is at a low viscosity, using little energy, then the oligomer is polymerized to a higher viscosity. The method in its simplest form comprises mixing a hydroxyl-endblocked polydiorganosiloxane fluid or polydiorganocyclosiloxane, or mixture of the two, with from 2 to 70 parts by weight of an acidic or neutral reinforcing filler, then catalyzing the mixture with sulfuric acid or a sulfonic acid of the formula $XSO_3H$, wherein X is selected from the group consisting of halogen, alkyl, aryl, alkoxy, and alkaryl radicals. After allowing the oligomer to polymerize, the catalyst is inactivated.

In the method of this invention the removal of traces of water from the mixture during the polymerization step allows the oligomer to be condensed to the point where the resulting polymer is of a gum consistency.

The method of this invention yields a silicone polymer-filler mixture suitable for use as an electrical insulation grease, or as a reinforced polymer mixture useful in producing silicone elastomers.

The method of this invention yields a mixture of silicone polymer and reinforcing filler using less energy than previous methods.

DESCRIPTION OF THE INVENTION

This invention relates to a method of producing a non-crepeing silicone polymer-filler mixture by bulk polymerization comprising (A) mixing (i) 100 parts by weight of oligomer selected from the group consisting of polydiorganosiloxane (a) of the formula $HO(R_2SiO)_xH$ 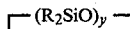 wherein each R is a radical selected from the group consisting of methyl, ethyl, propyl, phenyl, vinyl, allyl, and 3,3,3-trifluoropropyl, and x is an average value in the range of from 3 to 100 inclusive; polydiorganocyclosiloxane (b) of the formula $$[(R_2SiO)_y]$$

wherein R is as defined above and y is an average value in the range of from 3 to 10 inclusive; and mixtures thereof; optionally (i) can have present siloxane selected from the group consisting of polydiorganosiloxane (c) of the formula, $$R_3'SiO(R_2SiO)_zSiR_3',$$

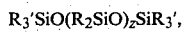

polydiorganosiloxane (d) of the formula $$R_3'SiO(R_2SiO)_zH,$$

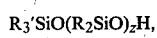

and mixtures thereof wherein each R is as defined above, each R' is a monovalent hydrocarbon radical of 6 or less carbon atoms, and z is an average value in the range of from 0 to 50 inclusive; (ii) from 2 to 70 parts by weight of reinforcing filler, said filler being acidic or neutral; and (iii) a catalytic amount of sulfuric acid or a sulfonic acid of the formula $XSO_3H$, wherein X is selected from the group consisting of halogen, alkyl, aryl, alkoxy, and alkaryl radicals, (B) allowing polymerization to take place, and (C) inactivating the catalyst with a Lewis base to produce a dispersion of reinforcing filler in a polydiorganosiloxane having a higher molecular weight than the starting material in (i).

The method of this invention comprises mixing the ingredients in a bulk polymerization method. For the purposes of this invention, this term means that there is no major diluent present. For example, the ingredients are not in the form of an aqueous emulsion or solvent dispersion. The amount of trace water that can be present depends upon the molecular weight desired in the final polydiorganosiloxane. If the polymerization is intended to produce a low molecular weight fluid, it can be sufficient if the ingredients used are such that no free water is present. The filler may have water bound to the surface, for instance. If the polymerization is intended to produce a high molecular weight fluid or gum, it is necessary that the ingredients be vigorously dried before mixing and/or any water present be removed during the polymerization step (B).

The method of this invention produces a dispersion of a high surface area, reinforcing filler within a linear polydiorganosiloxane. The method of this invention produces directly, and economically, a silicone polymer-filler mixture suitable for use in greases, sealants, and as a base mixture for use in producing silicone elastomers. These various types of products are produced from silicone polymer-filler mixtures which are made by varying the type and amount of reinforcing filler used, the molecular weight of the polymer formed, and the organic radicals present in the polymer.

The method of this invention uses an oligomer of low viscosity, such as a low molecular weight linear hydroxyl endblocked polydiorganosiloxane, a cyclic polydiorganosiloxane oligomer of low molecular weight, or a mixture of the two. The reinforcing filler is mixed with the oligomer before polymerization takes place. The amount of energy necessary to disperse uniformly the reinforcing filler in the oligomer is significantly lower than that necessary to disperse a reinforcing filler in a high molecular weight polymer, particularly polymers of the gum type used in making the conventional heat-cured silicone elastomers. The polymerization takes place at a faster rate due to the presence of the reinforcing filler.

It is conventional practice to use reinforcing fillers which have been pretreated, or reinforcing fillers which are treated in situ, in combination with silicone polymers to prevent the interaction between filler and polymer known as crepe-aging. It has been found that the product produced by the method of this invention does not require such pretreated filler or anti-crepe hardening agents in order to produce a non-crepeing mixture. The method of this invention is more economical because neither a pretreated filler or a treating agent is needed to produce a stable product.

It has been found that the method of this invention yields a silicone polymer-filler mixture which has low volatile content when compared to a silicone polymer-filler mixture prepared by earlier methods of manufacture such as polymerizing organocyclosiloxanes with strong alkaline catalysts, then mixing in reinforcing filler.

The starting oligomer used in the method of this invention is a linear hydroxyl endblocked polydiorganosiloxane (a), a cyclic polydiorganosiloxane (b), or mixtures of them. The linear polydiorganosiloxane (a) has the formula $$HO(R_2SiO)_xH$$

wherein each R is a radical selected from the group consisting of methyl, ethyl, propyl, phenyl, vinyl, allyl, and 3,3,3-trifluoropropyl.

There is an average of from 3 to 100 inclusive diorganosiloxy units per molecule. It is preferred that x be from 10 to 100 inclusive. The polydiorganosiloxane (a) is a known material, commonly manufactured by the addition of the appropriate diorganodichlorosilane to a water/solvent mixture to yield a mixture of low molecular weight hydroxyl-endblocked oligomers and cyclic siloxanes in solvent. Purification and distillation of the mixture yields both the polydiorganosiloxane (a) of the above formula and also the polydiorganocyclosiloxane (b) of the formula $$\overline{[(R_2SiO)_y]}$$

wherein y is an average value in the range of from 3 to 10 inclusive, and each R is as defined above. The mixture of the linear polydiorganosiloxane (a) and the polydiorganocyclosiloxane (b) can be used in the method of this invention without their separation from each other in the above described hydrolysis procedure. The material to be polymerized can also contain a polydiorganosiloxane (c) of the formula $$R_3'SiO(R_2SiO)_zSiR_3'$$

or polydiorganosiloxane (d) of the formula $$R_3'SiO(R_2SiO)_zH$$

wherein each R is as defined above and each R' is a monovalent hydrocarbon radical of 6 or less carbon atoms such as methyl, ethyl, propyl, butyl, vinyl, or phenyl, and z is an average value of from 0 to 50 inclusive. These polydiorganosiloxanes (c) and (d) are used in situ to introduce $R_3'SiO_{0.5}$ endblocking units into the polymer being formed. When the stable silicone polymer-filler mixture produced by the method of this invention is to be used in a relatively low viscosity application, such as in sealant materials or electrical insulation greases, it is desirable to include $R_3'SiO_{0.5}$ units to aid in obtaining a polymer of the desired molecular weight.

The amount of ingredients (c) and (d) to be added is determined by the average molecular weight desired in the final silicone polymer-filler mixture. Larger amounts of (c) and (d) in the starting materials will yield lower molecular weight in the final product. The optimum amount of (c) and (d) to use to obtain the desired result is best determined by experiment.

The polydiorganosiloxane (c) of the above formula and the polydiorganosiloxane (d) of the above formula are known materials. The siloxanes (c) and (d) can be easily produced by reacting a low molecular weight hydroxyl endblocked polydiorganosiloxane with a reactive silane of the formula $(R_3'Si)_nX$ where n is the valence of the reactive group, X. X can be any of the well known groups which react with hydroxyl groups on silicon such as —Cl, —NH₂, —NR₂³, —N(R³)COR³, —NHR³, =NH, and ≡NR³. R³ is selected from the group consisting of monovalent hydrocarbon radicals of 5 or less carbon atoms, phenyl radical, and benzyl radical. When the reactive silane is added to the hydroxyl endblocked polydiorganosiloxane the materials react spontaneously, resulting in the replacement of the hydroxyl group with an $R_3'SiO_{0.5}$ group. The by-product hydrogen chloride, ammonia, or amide is easily removed from the reaction mixture. One preferred method uses the addition of stoichiometric amounts of two reactive silanes such as $(R_3'Si)Cl$ and $(R_3'Si)NH_2$ to a hydroxyl endblocked polydiorganosiloxane. The leaving groups then react with each other and the salt is easily filtered from the reaction mixture.

A preferred form of the polydiorganosiloxane (c) is of the formula $R_3'SiOSiR_3'$ which are cleaved in the method to provide the $R_3'SiO_{0.5}$ endblocking radicals. This disiloxane can be easily co-reacted with the polydiorganosiloxane (a) or the polydiorganocyclosiloxane (b) or mixtures of the two during the polymerization step (B) to provide the endblocking needed to produce the desired molecular weight. The amount of (c) added is determined by the molecular weight of the desired siloxane polymer in the final silicone polymer-fill mixture; the more of (c) that is added, the lower the molecular weight will be. In this embodiment wherein the disiloxane can be co-reacted during the polymerization, the amount of disiloxane to be added is best determined by experimentation using the desired (a) and/or (b) and the reinforcing filler (ii) because the amount of (c) necessary will be influenced by the presence of the reinforcing filler. The more of (c) that is added, the lower the molecular weight of the siloxane polymer in the final silicone polymer-filler mixture. The amount of (c) will normally be small, less than 5 parts by weight per 100 parts by weight of (a) plus (b); preferably less than 1 part by weight where a silicone polymer of an average molecular weight greater than 50,000, for instance, is desired.

The polydiorganosiloxane (d) can be produced using the reaction between diorganocyclotrisiloxane and organo lithium compounds described in U.S. Pat. No. 3,337,497, issued Aug. 22, 1967, to Bostick, which is hereby incorporated by reference to show the preparation of polydiorganosiloxane (d) having a hydroxyl radical at one end and a $R_3'SiO_{0.5}$ radical at the other end. Other methods of producing (d) are disclosed in U.S. Pat. No. 3,274,145, issued Sept. 20, 1966, to Dupree, which is hereby incorporated by reference to show preparation of polydiorganosiloxane (d). In this embodiment, as above for the use of (c), the amount of (d) to be added is best determined by experimentation using the desired (a) and/or (b) and the reinforcing filler (ii) because the amount necessary will be influenced by the presence of the reinforcing filler. An increase in (d) will lower the molecular weight of the final polymer. The amount will normally be small, less than 5 parts by weight based upon 100 parts by weight of (a) plus (b).

A silicone polymer-filler mixture having a silicone polymer containing reactive organic radicals can be produced through the use of (c) or (d) in which at least one of the R'radicals is a reactive radical such as vinyl or allyl. A polydiorganosiloxane (a) having reactive organic radicals along the chain can be produced by mixing a hydroxyendblocked polydiorganosiloxane with a silane such as methylvinyl-bis(N-methylacetamido)silane. Such reactive groups are desirable in some of the methods used to produce a curable composition from the silicone polymer-filler mixture.

When (c) or (d) are present in the polymerization, the product can be a mixture of polymers, some having one end $R_3'SiO_{0.5}$ and the other end hydroxy radical, some having both ends $R_3'SiO_{0.5}$, and some having both ends hydroxyl radicals. The amounts of each type of polymer present depends upon how much (c) or (d) is added, how much reactive filler surface is present, and how vigorous the polymerization conditions used are.

The fillers used in the method of this invention are those which are finely divided particles of an acidic or neutral nature and are classed as reinforcement for silicone elastomers. Examples of such fillers include carbon black; amorphous silica such as fumed silica, precipitated silica, and diatomaceous earth; and fumed titanium dioxide. The reinforcing fillers have particle sizes in the colloidal range and specific surface area of greater than 50 m²/g, usually above 150 m²/g. The most useful reinforcing filler is fumed silica with a specific surface area of from 150 m²/g to 450 m²/g. These reinforcing fillers exhibit varying amounts of acidity due to hydroxyl radicals present on their surface. For the purpose of this invention, an acidic filler is one which gives a pH of less than 7 when a 2 percent by weight slurry is prepared with distilled water. A neutral filler would give a pH of about 7.

The presence of the filler may have an effect upon the polymerization rate of the oligomer. When fumed silica is used as the reinforcing filler and dodecylbenzene sulfonic acid is used as the catalyst, the polymerization rate increases as the available filler surface area increases. The available surface area of the filler is dependent upon the amount of filler used, the surface area of the filler used, and the ability of the mixing process to expose the total surface area of the filler to the oligomer. For purposes of this invention, it is assumed that when fumed silica is mixed with oligomer in a high shear mixer, such as a dough mixer, the total area of the fumed silica, as customarily measured, is available. For instance, 10 grams of fumed silica having a surface area of 250 m²/g would have a total of 2500 m² of available surface area. In order to obtain a high molecular weight in a reasonable time, it is preferred that there be greater than 50 square meters of filler surface area per gram of oligomer.

The amount of reinforcing filler preferred is determined by the end use, the amount may be from 2 to 70 parts by weight, based upon 100 parts by weight of oligomer. As little as 2 percent by weight is sufficient for end uses such as antifoam materials. Electrical insulation compounds commonly contain about 10 percent filler for instance. A silicone polymer-filler mixture for use in a silicone elastomer may have about 10 parts by weight filler or lower in a composition used as a sealant to as high as about 70 parts by weight in a high consistency gum product, both amounts based upon 100 parts by weight of siloxane polymer. There may be more than one type of filler used.

Polymerization of the oligomer in the method of this invention is catalyzed by sulfuric acid or a sulfonic acid of the formula $$XSO_3H$$

wherein X is selected from the group consisting of halogen, alkyl, aryl, alkoxy, and alkaryl radicals. When X is a halogen, chlorine is preferred. Alkyl radicals include up to 18 carbon atoms. Aryl radicals include phenyl and tolyl. Alkoxy radicals include up to 18 carbon atoms. Alkaryl radicals include monoalkyl and dialkyl substituted benzene sulfonic acids. Preferred at this time are the monoalkyl substituted benzene sulfonic acids of the formula $$R^2C_6H_4SO_3H$$

wherein $R^2$ is a monovalent hydrocarbon radical of at least 6 carbon atoms. A preferred aliphatically substituted benzene sulfonic acid is dodecylbenzene sulfonic acid. A dialkyl substituted benzene sulfonic acid is dinonylbenzene sulfonic acid. The sulfuric acid and sulfonic acid are hereinafter referred to as catalyst.

When the oligomer to be polymerized contains both polydiorganosiloxane (a) and polydiorganocyclosiloxane (b) or only the polydiorganocyclosiloxane (b), the preferred catalyst is concentrated sulfuric acid because it catalyzes the polymerization of both types of oligomer at reasonable rates. The preferred amount is about 1 part by weight per 100 parts by weight of oligomer. When the oligomer is only polydiorganosiloxane (a), the preferred catalyst is a monoalkyl substituted benzene sulfonic acid with dodecylbenzene sulfonic acid being most preferred. The monoalkyl substituted benzene sulfonic acid catalyzes polydiorganocyclosiloxane (b) at a slow rate, but catalyzes polydiorganosiloxane (a) at a fast rate through condensation of hydroxyl groups. This condensation takes place without the formation of low molecular weight cyclic species so that the stable silicone polymer-filler mixture produced by this embodiment has a low weight loss upon heat aging. The preferred amound of sulfonic acid is from 0.5 part to 1.0 part by weight per 100 parts by of oligomer.

Because the polymerization of the oligomer is inhibited by water, the sulfuric acid or sulfonic acid used should contain as little water as is practical. For instance, when sulfuric acid is used, it should be in the form of concentrated sulfuric acid.

After polymerization is completed, the catalyst is inactivated by mixing in a Lewis base. Sufficient Lewis base is added to neutralize the catalyst. A large excess should not be used. Preferred Lewis bases include ammonia, concentrated ammonium hydroxide, amines such as diethylamine, basic metal oxides such as calcium oxide and magnesium oxide, silazanes such as hexamethyldisilazane, and alkoxides such as potassium tertiary butoxide and magnesium isopropoxide. A preferred inactivating agent is magnesium oxide with calcined magnesium oxide preferred when the silicone polymer-filler mixture is polymerized to the point where the silicone polymer is of a high molecular weight. In those applications where the heat stability of the cured product is of importance, a minimum amount of calcined magnesium oxide is preferred.

The initial step in the method of this invention includes the mixing of the oligomer with the untreated reinforcing filler. The more uniformly and completely the filler is dispersed in the oligomer, the more uniform the final product. Because the rate of polymerization is increased by the presence of the reinforcing filler, the uniformity of the initial mixing will also effect the uniformity of the rate of polymerization. The mixing method can vary from stirring in a container to intensive mixing such as passing the mixture through a colloid mill. If a reinforcing filler such as fumed silica having a surface area in the range of 150 m$^2$/g to 750 m$^2$/g is stirred into the oligomer without substantial shear, poor mixing will result and the resulting silicone polymer-filler mixture will contain particles referred to as gel particles. These gel particles are areas of high filler content. When they are present in a cured elastomer, they are discontinuities which effect the color, uniformity, and physical properties in an adverse manner. When the reinforcing filler is dispersed into the oligomer using high shear, it is possible to obtain a more uniform dispersion that produces fewer gel particles in the silicone copolymer-filler mixture. Because the mixture of oligomer and filler has a low viscosity, the mixture can be filtered before polymerization to remove any particles present. The mixture will have a lower plasticity when dispersion is complete and the cured silicone elastomer has improved physical properties.

The device used to contain the mixture of filler dispersed in oligomer during the polymerization is determined by the type of silicone polymer-filler mixture being produced. When a sealant type mixture was being prepared, a heavy duty kitchen mixer used in the laboratory. A requirement upon the mixer in such a case is that the mixer be sufficiently strong to contain and mix the contents at the final viscosity after polymerization. When the material being produced is to be a high consistency base mixture for use in producing silicone elastomers, the container must be capable of stirring the mixture during polymerization, heating the mixture, removing moisture from the mixture by application of a dry gas purge, a vacuum, or both, and cooling the mixture. The device used can be used both to disperse the filler in the oligomer and to polymerize the oligomer. For instance, when making base material for use in sealants, a commercial mixer having both a planetary mixing blade for stirring and a high speed, high shear mixing blade for dispersing the filler has been used. This mixer can be closed and the contents exposed to a sweep of dry gas, or to reduced pressure, or to both. The contents can be heated and cooled as needed.

In its simplest form, the method of this invention comprises mixing oligomer and reinforcing filler, adding sulfonic acid catalyst, allowing polymerization to take place, and inactivating the catalyst. This simple procedure produces a dispersion of reinforcing filler in a polydiorganosiloxane having a higher molecular weight that the starting oligomer. The mixing of the oligomer, reinforcing filler, and catalyst in step A can be in any order as long as the mixing is completed before the polymerization of the oligomer progresses to an appreciable degree. For example, the catalyst can be dispersed in the oligomer, then immediately dispersing the filler into the catalyzed mixture before the viscosity of the mixture rises sufficiently to make the dispersion more difficult. A preferred method disperses the filler into the oligomer, then adds the catalyst. This simple method is limited in the molecular weight that can be reached because of water that is in the system. Hydroxyl radicals in the system act as endblocking units and limit the molecular weight that can be reached. In order to obtain higher molecular weights, it is necessary to limit the amount of water in the system during polymerization. Since water is formed during the polymerization reaction, the removal of water during the polymerization reaction allows the formation of higher molecular weights.

When higher molecular weights are desired, the container must be as described above in that it must be sealable and equipped to remove the water. Methods used have included a sweep of dry nitrogen gas, reducing the pressure in the container by drawing a vacuum, and a combination of the two methods. When high molecular weights are required, 200,000 weight average molecular weight for example, it is necessary to be even more particular to remove water. The oligomer may contain free water and the filler normaly has water absorbed on its surface. After the oligomer and filler are mixed and placed in the container, the mixture is heated to from 100° to 170° C. and the water given off is removed as above. This heating and water removal is continued until essentially all water is removed. The temperature is reduced to below 125° C., preferably from 80° C. to 100° C., and the sulfonic acid catalyst is added without allowing water to enter the system. The water formed during polymerization is continuously removed so that the polymerization can continue to the desired degree.

The degree of polymerization obtained by the method of this invention is also a function of the temperature. It has been found that polymerization can be initiated by heating the mixture to elevated temperatures, from 80° C. to 125° C. for instance. After initiation, the temperature is reduced in order to produce high molecular weight polymers. The mixture should be cooled to below 40° C., preferably to 30° to 35° C. or even to room temperature, to form high molecular weight materials. The initiation at higher temperatures does reduce the time required to reach a high molecular weight however. For instance, when the catalyst was added at a mixture temperature of 120° C., then the mixture cooled to 40° C., the polymerization was completed in less than 30 minutes. When the catalyst was added to a similar mixture, but at 40° C. to begin with, the polymerization took 1 hour. In another comparison, when a hydroxyl-endblocked polydimethylsiloxane oligomer was mixed with filler, then catalyzed at 30° C. with dodecylbenzenesulfonic acid, it required 17 hours to reach a weight average molecular weight of 134,000. In contrast, heating a similar mixture to 150° C. and drying, then cooling to 120° C. and adding the catalyst, then cooling to 30° C., gave a molecular weight of 162,000 is only 1 hour after the catalyst addition.

After the desired molecular weight of the polymer has been achieved, the catalyst is inactivated with a Lewis base as described above. One method of estimating the point at which the desired molecular weight is reached is following the rise in viscosity of the polymer-filler mixture. The amount of inactivating material added is, of course, dependent upon the kind and amount of catalyst used and the inactivating material used. A molar excess of inactivating material based upon the sulfuric or sulfonic acid is used to ensure that the silicone polymer-filler mixture is stable upon storage, that is, it does not crepe. When diethylamine was used as the inactivating material, it was found preferable to use a minimum of 3 moles of diethylamine per mole of catalyst, dodecylbenzenesulfonic acid for instance. When magnesium oxide was used as the inactivating agent, from 0.4 part by weight to 5 parts by weight based upon 100 parts of oligomer were used. It was found that from 0.4 to 1.4 parts by weight of magnesium oxide was preferred. The most preferred amount of magnesium oxide to inactivate dodecylbenzene sulfonic acid is 1 part by weight of magnesium oxide per 1 part by weight of dodecylbenzene sulfonic acid. This corresponds to approximately 7 moles of magnesium oxide per mole of the sulfonic acid. When the silicone polymer-filler mixture is going to be used at elevated temperatures, it is preferred that a minimum amount of magnesium oxide be used because the heat stability of the cured silicone elastomer is degraded by larger amounts of magnesium oxide. Additional considerations in selecting a preferred Lewis base include whether it is more convenient to add a gas, a liquid, or a solid in view of the equipment being used. Another consideration is whether any salt formed is to be removed or not. Salts which may effect the heat stability of the products produced should be removed. Byproduct salts from magnesium oxide show little effect on the heat stability.

A preferred method of producing a non-crepeing polymer-filler mixture for use as a sealant base mixture comprises mixing, under high shear conditions, 100 parts by weight of hydroxyl-endblocked polydiorganosiloxane and from 5 to 20 parts by weight of untreated fumed silica having a surface area of from 175 m$^2$/g to 300 m$^2$/g. This mixture, at room temperature, is mixed with from 0.5 part to 0.7 part by weight of dodecylbenzene sulfonic acid for sufficient time to reach the desired molecular weight, observed by the change in viscosity of the mixture. Typical times are from 5 minutes to 30 minutes. The sulfonic acid is then inactivated by mixing in from 0.3 to 0.5 part of diethylamine (approximately 3 moles diethylamine per mole of dodecylbenzene sulfonic acid). The base mixture is then ready for conversion into a curable composition by addition of a curing agent.

A preferred method of producing a non-crepeing silicone polymer-filler mixture for use as a base mixture for a high consistency gum-type silicone elastomeric composition comprises mixing, under high shear conditions, 100 parts by weight of hydroxyl-endblocked polydiorganosiloxane oligomer and from 20 to 60 parts by weight of fumed silica having a surface area of from 175 m$^2$/g to 300 m$^2$/g. After the fumed silica is dispersed in the oligomer, the mixture is of a grease-like consistency. The mixture is placed in a mixer as described above, heated to from 100° C. to 170° C., preferably 150° C., and subjected to a reduced pressure of from 13 to 26 kiloPascals to remove any moisture. A drying period of 4 hours has been found to be sufficient in laboratory quantities. The mixture is then cooled to from 80° C. to 100° C. and from 0.5 to 1 part by weight of dodecylbenzene sulfonic acid is admixed for each 100 parts by weight of oligmer. The system remains sealed and under reduced pressure to remove moisture during the polymerization. The mixture is cooled to from 30° C. to 35° C. and held for a minimum of 15 minutes to allow polymerization to a high polymer. Polymerization times are generally from 15 minutes to 1 hour. The polymerized mixture is then inactivated by admixing from 0.4 to 1.4 parts by weight, preferably 0.5 part by weight, of calcined magnesium oxide. The inactivated mixture is a non-crepeing silicone polymer-filler mixture useful as a base mixture for further mixing with a curing agent to produce a curable composition. Polymerization following this method does not produce cyclic material. For this reason, the silicone polymer-filler mixture has a low weight loss, for instance less than 5 percent when heated for 3 hours at 150° C.

The silicone polymer-filler mixture obtained by following the method of this invention is useful in a manner similar to that used with conventional filled polydiorganosiloxane obtained by polymerizing a polydiorganosiloxane to the desired viscosity and then adding filler by mixing in a high strength mixer such as a dough mixer or a two-roll mill. The method of this invention yields a silicone polymer-filler mixture similar to those previously available, but with a significantly lower net energy requirement, therefore at a lower cost. The silicone polymer-filler mixture is a non-crepeing mixture. It does not require the presence of pretreated filler or anti-crepe agents to prevent crepe-aging of the mixture over a period of time as is necessary with the conventional method of mixing a high viscosity polydiorganosiloxane and reinforcing filler together and storing for a period of time. The silicone polymer-filler mixture can be used in silicone mixtures used as electrical insulation compounds, in greases, or in producing elastomers in the well-known methods of producing such products.

The silicone polymer-filler mixtures produced by the method of this invention are useful in producing curable compositions which yield cured silicone elastomer. They can be used in a manner similar to that done with conventional mixtures of high viscosity polydiorganosiloxanes and filler. A common method is the addition of an organic peroxide vulcanizing agent to a filled polydiorganosiloxane mixture. The organic peroxide vulcanizing agents suitable for use in silicone elastomers are well known. If the polydiorganosiloxane does not contain any vinyl radicals, it preferably is vulcanized with organic peroxides that are efficient in causing reactions in such polydiorganosiloxanes. Such organic peroxides are labeled "non-vinyl specific" and are represented by such organic peroxides as benzoylperoxide and 2,4-dichlorobenzoylperoxide. If the polydiorganosiloxane contains vinyl radicals, it can be vulcanized with either "non-vinyl specific" or "vinyl specific" organic peroxides. Representative of the vinyl specific organic peroxides are ditertiary-butyl peroxide and 2,5-bis-(tert-butylperoxy)-2,5-dimethylhexane. The properties of the cured silicone elastomer can be altered by the type and amount of vulcanizing agent used to cure the composition. Typical changes due to such choices are well recognized in the art. The organic peroxide vulcanizing agent can be present in amounts from 0.1 to 5 parts by weight per 100 parts by weight of the filled polydiorganosiloxane, preferably from 0.5 to 2.0 parts by weight.

The embodiments of the method of this invention which give a polymer having hydroxyl groups on the ends can be further mixed with curing agents to yield curable compositions. A number of methods are known for combining hydroxyl containing polydiorganosiloxane in an essentially anhydrous mixture with a curing agent to yield a one part curable composition. These compositions cure to silicone elastomers upon exposure to the atmosphere. Methods are available based upon tri-functional and tetra-functional silanes as crosslinking agents as well as short polymeric crosslinkers. Among the functional groups used are acetoxy radicals, alkoxy radicals, amino radicals, and amido radicals. Common crosslinkers include those represented by the formulas:

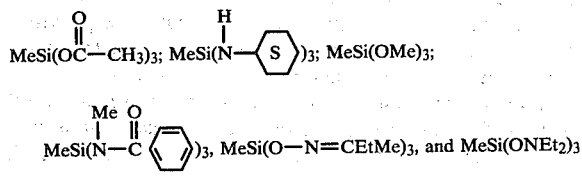

where Me is the methyl radical and Et is the ethyl radical. Common catalysts for these systems include metal carboxylates, alkyl metal carboxylates, alkyl metal alkoxides, and titanates. Preferred catalysts are stannous octoate, dibutyltindiacetate, dibutyltindilaurate, tetrabutyltitanate, dibutyltindimethoxide, and tetraisopropyltitanate. Methods of producing compositions which cure to silicone elastomers upon exposure to moisture based upon hydroxyl-containing polydiorganosiloxanes which can be adapted to the silicone polymer-filler mixture of this invention include those disclosed in U.S. Pat. Nos. 3,077,465, issued Feb. 12, 1963 to Bruner; 3,189,576, issued June 15, 1965 to Sweet; 3,294,739, issued Dec. 27, 1966 to Weyenberg; and 3,334,067, issued Aug. 2, 1967 to Weyenberg; all of which are incorporated by reference to teach methods of mixing curing agents into hydroxyl containing polydiorganosiloxanes in which the silicone polymer-filler mixture of this invention can be substituted to yield one part compositions stable in the absence of moisture which cure to silicone elastomers upon exposure to moisture.

Methods are known for combining hydroxyl-containing polydiorganosiloxanes with curing agents that produce two part products which cure at room temperature upon mixing the ingredients. Examples of such methods in which the products of this invention can be substituted are found in U.S. Pat. Nos. 3,061,575, issued Oct. 3, 1962 to Russell; 3,184,427, issued May 18, 1965 to Russell et al.; 3,509,081, issued Apr. 28, 1970 to Gignac, Jr; and 3,989,668, issued Nov. 2, 1976 to Lee et al., all of which are incorporated by reference to teach methods of mixing curing agents into hydroxyl containing polydiorganosiloxanes in which the silicone polymer-filler mixture of this invention can be substituted to yield compositions which cure to silicone elastomers.

Silicone polymer-filler mixture containing two or more unsaturated monovalent aliphatic radicals per polymer molecule such as vinyl and allyl radicals can be combined with a curing agent comprising an organohydrogensiloxane having an average of greater than two silicon-bonded hydrogen atoms per molecule, and a platinum-containing catalyst in an amount sufficient to provide at least one part by weight platinum per million parts by weight polydiorganosiloxane. The organohydrogensiloxane is present in sufficient quantity to provide from at least one silicon-bonded hydrogen atom per unsaturated monovalent aliphatic radical in the polydiorganosiloxane. The polydiorganosiloxane in the mixture preferably contains from 0.01 to 2.0 mole percent unsaturated monovalent aliphatic radical. Examples of such curing methods are found in U.S. Pat. Nos. 3,697,473, issued Oct. 10, 1973, to Polmanteer et al.; 3,445,420, issued May 20, 1969, to Kookootsedes et al.; and 4,032,502, issued June 28, 1977 to Lee et al., all of which are incorporated by reference to teach methods of mixing curing agents into diorganosiloxanes containing unsaturated monovalent aliphatic radicals in which the stable silicone polymer-filler mixture containing unsaturated monovalent aliphatic radicals of this invention can be substituted for the diorganosiloxane to produce curable compositions.

The silicone polymer-filler mixture of this invention can also contain extending fillers such as commonly used in silicone elastomers. Acidic or neutral extending filler can be added either before or after polymerization. Addition after polymerization would be in the usual manner such as mixing in a dough mixer or on a two roll mill.

The silicone polymer-filler mixture of this invention can also be combined with the additives normally used with silicone polymer-filler mixtures such as thickeners, pigments, heat stability additives, oil resistance additives, and flame resistance additives.

The following examples are included for illustrative purposes only and should not be construed as limiting the invention which is properly set forth in the appended claims. All parts are parts by weight.

EXAMPLE 1

A dough mixer equipped for heating, cooling, and purging with dry nitrogen was used in this example. A mixture of 230 g of a hydroxyl-endblocked polydimethylsiloxane having a degree of polymerization of about 35 (viscosity of about 0.07 Pa·s and weight average molecular weight of about 2600) and 70 g of a fumed silica having a surface area of about 400 m²/g were mixed for 30 minutes in a glass jar, then for 30 minutes in the dough mixer which had been heated to 170° C. under nitrogen purge. Heating was stopped and the mixer was then cooled to 140° C., the nitrogen purge stopped, and 1.22 ml of concentrated sulfuric acid was added as a condensation catalyst. After a 15 minute period, the nitrogen purge was resumed as the mixer and contents continued to cool. The reaction was held complete 3.75 hours after the catalyst addition by monitoring the change in viscosity. The catalyst was neutralized by then mixing the mixture on a 2-roll mill with 11 g of magnesium oxide which had been previously calcined by heating for 4 hours at 500° C. to yield a base mixture consisting of fumed silica dispersed in a hydroxyl endblocked polydimethylsiloxane.

The molecular weight of the polymer in the base mixture was determined by mixing a sample of the base mixture with a 50/50 mixture of toluene and ammonia. This was placed in a shaker for 48 hours to dissolve the base mixture in the solvents. The silica was removed from the toluene layer by centrifuging for 3 hours at 3200 rpm. The toluene-polymer layer was decanted into a watch glass and the toluene allowed to evaporate, then the residue was dried at 80° C. for 3 hours in a vacuum oven. The molecular weight of the polymer was then measured by use of gel permeation chromotography techniques. The result shown in Table I illustrates the amount of polymerization of the starting oligomer.

The base mixture was strained by extruding it through a wire screen with a space between the wires of 0.27 mm. The base mixture was then base heated by heating for a period of 3 hours at 150° C. in an air-circulating oven to devolatilize, yielding a devolatilized base mixture. The base had a weight loss of 11 percent during this heating period.

Twenty gram portions of the devolatilized base mixture were then mixed with either 0.3 g (1.5 parts per hndred) identified as Sample 1, or 0.6 g (3.0 pph) identified as Sample 2, of a 50 percent by weight mixture of 2,4-dichlorobenzoyl peroxide in an inert carrier. These catalyzed portions were then compression molded for 5 minutes at 116° C. into test slabs. Some of the test slabs were post cured for 4 hours at 200° C.

Test samples were cut from both press molded and post cured slabs and properties measured in accordance with ASTM D-2240 for durometer and ASTM D-412 for tensile strength at break and elongation at break. Molecular weights are weight averages. The test results shown in Table I illustrate the useful properties of the cured silicone elastomer.

EXAMPLE 2

The method of Example 1 was repeated except the beginning polydiorganosiloxane was polydimethylcyclosiloxane with an average degree of polymerization of about 4. The sulfuric acid was mixed with an equal weight of the cyclic siloxane and allowed to react before the 50/50 mixture was added to the mixture of cyclic siloxane and filler in the mixer. The reaction was completed in only one hour in this case. The mixture was neutralized, strained, base heated, and tested as in Example 1 with the results as shown in Table I as Sample 3.

TABLE I

| Sample | Peroxide parts | Post Cure | Durometer Shore A | Tensile Strength MPa (megaPascal) | Elongation percent | Polymer Molecular Weight |
|---|---|---|---|---|---|---|
| 1 | 1.5 | no | 45 | 6.79 | 393 | 362,000 |
| 1 | 1.5 | yes | 45 | 5.64 | 373 | — |
| 2 | 3.0 | no | 52 | 7.83 | 225 | — |
| 2 | 3.0 | yes | 51 | 6.28 | 253 | — |
| 3 | 3.0 | no | 57 | 6.62 | 263 | 199,000 |
| 3 | 3.0 | yes | 55 | 6.00 | 260 | — |

EXAMPLE 3

The method of Example 1 was followed except the catalyst used was 2.3 g of dodecylbenzene sulfonic acid. The polymerization time was 2 hours.

During the base heating step, the mixture lost only 4.5 percent of its weight rather than the 11 percent of Example 1. The beginning hydroxyl-endblocked polydimethylsiloxane had a weight loss of 2.9 percent when heated in the same manner as used in the base heating step.

The mixture, when tested as in Example 1, had the properties shown in Table II.

EXAMPLE 4

The method of Example 3 was followed except the beginning polydiorganosiloxane was a mixture of 230 g of the hydroxyl-endblocked polydimethylsiloxane and 2.7 g of a hydroxyl-endblocked polymethylvinylsiloxane having an average of about 10 methylvinylsiloxy units per molecule. This ratio gives a copolymer having 1 mol percent vinyl radical after polymerization. The polymerization was for 1.2 hours. The polymer was analyzed after polymerization and found to contain 1.03 mol percent methylvinylsiloxy units.

Forty gram portions of the devolatilized base mixture were catalyzed with 1.2 g of dicumyl peroxide, a vinyl specific catalyst. The catalyzed sample was molded for 10 minutes at 150° C., then tested as in Example 1. The results shown in Table II illustrate the polymerization of the oligomer and the useful properties of the catalyzed and cured silicone polymer-filler mixture.

TABLE II

| Example | Peroxide parts | Post Cure | Durometer Shore A | Tensile Strength MPa (megaPascal) | Elongation percent | Polymer Molecular Weight |
|---|---|---|---|---|---|---|
| 3 | 1.5 | no | 18 | 1.47 | 267 | 180,000 |
| 3 | 1.5 | yes | 26 | 1.32 | 230 | — |
| 3 | 3.0 | no | 41 | 5.33 | 313 | — |
| 3 | 3.0 | yes | 44 | 5.37 | 316 | — |
| 4 | 1.2 | no | 49 | 5.76 | 197 | 148,000 |
| 4 | 1.2 | yes | 49 | 5.17 | 200 | — |

EXAMPLE 5

The method of Example 2 was followed except the catalyst was 2.3 g of dodecylbenzene sulfonic acid. After a polymerization time (the time after catalyzation) of 6 hours, a low viscosity base mixture had formed. Similiar tests with substitution of p-toluene sulfonic acid as the catalyst and with octyl benzyl sulfonic acid as the catalyst gave similiar results. These catalysts did not polymerize polydimethylcyclosiloxane as rapidly as did sulfuric acid when the same method and temperatures were used.

EXAMPLE 6

The method of Example 1 was followed using 2.3 g of octylbenzyl sulfonic acid as the catalyst and polymerization was for 1.8 hours. A base mixture resulted which yielded the results shown in Table III when tested as in Example 1 illustrating the polymerization of a hydroxyl endblocked polydimethylsiloxane oligomer with this catalyst.

The above was repeated but using the cyclic siloxane of Example 2 in place of the linear siloxane. A higher molecular weight polymer resulted after a polymerization time of 5.5 hours.

EXAMPLE 7

The method of Example 1 was followed using 2.3 g of p-toluene sulfonic acid and a polymerization time of 1 hour to yield a successful base mixture. Tested as in Example 1, the results shown in Table III illustrate the usefulness of this catalyst.

EXAMPLE 8

A mixture was prepared by mixing 214 g of the polydimethylsiloxane of Example 1 with 86 g of fume silica having a surface area of about 130 m$^2$/g which gave 40 parts of filler per 100 parts of polymer. The polymer-filler mixture was placed in a dough mixer at 25° to 30° C. and mixed until massed. Then 2.14 g of dodecylbenzene sulfonic acid was added and a nitrogen purge started. After 30 minutes the reaction was complete. The catalyst was neutralized by mixing in 11 g of calcined magnesium oxide (5 parts per hundred of polymer).

The polymer molecular weight was measured with the result as shown in Table III showing the polymerization of the oligomer. Tested as in Example 1, the results shown in Table III illustrate the useful properties of the cured mixture.

EXAMPLE 9

A copolymer was formed by first mixing 230 g of the polydimethylsiloxane of Example 1 with 0.67 g of methylvinyl-bis(N-methylacetamido)silane in a rotating jar for one hour. This gave a theoretical 0.1 mol percent vinyl radical in the finished polymer. Then 70 g of the fumed silica of Example 8 was added and mixing continued for 30 minutes. After sitting overnight, the mixture was placed in a dough mixer at 25°-30° C. and mixed until massed. Then 2.3 g of dodecylbenzene sulfonic acid was added and the pressure in the mixer was reduced to between 13.3 and 26.6 kPa. After one hour the polymerization was complete. The catalyst was neutralized with 11 g of magnesium oxide.

The mixture was then tested as in Example 8 with the results in Table III showing that the oligomer was polymerized and the cured silicone elastomer had useful properties.

TABLE III

| Example | Peroxide parts | Post Cure | Durometer Shore A | Tensile Strength MPa (megaPascal) | Elongation percent | Polymer Molecular Weight |
|---|---|---|---|---|---|---|
| 6 | 3.0 | no | 46 | 4.76 | 296 | 196,200 |
| 6 | 3.0 | yes | 43 | 4.20 | 273 | — |
| 7 | 3.0 | no | 42 | 4.05 | 306 | 150,300 |
| 7 | 3.0 | yes | 42 | 4.69 | 313 | — |
| 8 | 3.0 | yes | 41 | 6.17 | 333 | 266,000 |
| 9 | 3.0 | yes | 44 | 5.68 | 240 | 170,000 |

EXAMPLE 10

A series of silicone polymer-filler mixtures were prepared using dodecylbenzenesulfonic acid as the catalyst and a series of fillers of different surface area.

In each case, 230 g of the hydroxyl endblocked polydimethylsiloxane of Example 1 was mixed with 70 g of filler by rotating for 30 minutes in a glass jar. After an overnight period, the mixture was placed in a dough mixer which had been heated to 170° C. The mixture was stirred for 30 minutes under a purge of dry nitrogen, reaching a temperature of 150° C. The mixer was cooled to 40° C. and 2.3 g of dodecylbenzenesulfonic acid added. Mixing was continued and every 15 minutes a small sample was taken from the mixture.

Each of these samples was treated as described in Example 1 to determine the weight average molecular weight. A graph was then constructed showing the time of polymerization versus the average molecular weight for each filler. From these graphs, the time required to reach a weight average molecular weight of 50,000 was determined for each filler. These results are shown in Table IV.

The graph of weight average molecular weight for each filler showed that the polymerization proceeded at a linear rate, at least until a weight average molecular weight of 100,000. The data in Table IV shows that the rate of polymerization is dependent upon the filler that is present. As the surface area of the filler is increased, the rate of polymerization is increased.

TABLE IV

| Filler | Filler Surface Area (m$^2$/g) | Time Required to Reach Mw of 50,000 (hours) |
|---|---|---|
| None | — | 0.63 |
| Ground Quartz | 1.0 | 0.43 |
| Fumed Silica | 130 | 0.50 |
| Fumed Silica | 200 | 0.18 |
| Fumed Silica | 250 | 0.10 |
| Fumed Silica | 400 | 0.07 |

EXAMPLE 11

A series of polymerization were performed in which the oligomer-filler mixture was mixed under high shear conditions before polymerization.

Each mixture consisted of 100 parts of the polydimethylsiloxane oligomer of Example 1 with 0.1 mol percent of methylvinylsiloxy units added as methylvinyl-bis(N-methylacetamido)silane as in Example 9, and 25 parts of fumed silica having a surface area of about 250 m$^2$/g. The oligomer-filler mixture was stirred in an oscillating-blade mixer until a uniform viscous fluid resulted. This mixture was then passed through a colloid mill at progressively smaller clearances to yield progressively higher shear to give a series of fluid mixtures. The relative rates of shear are shown in Table V as 5 to 9 where 5 is the mixture from the oscillating mixer and 9 is the highest shear level. The mixture temperature raised to about 50° C. while going through the colloid mill.

Each mixture was polymerized by placing it in a dough mixer at 25°-30° C., reducing the pressure to 13 to 26 kPa, then adding 1 part of dodecylbenzene sulfonic acid based upon 100 parts of oligomer. After one hour the polymerization was complete and the catalyst was neutralized by mixing in 0.5 part of magnesium oxide for each 100 parts of oligomer.

Each base mixture was then heated for 3 hours at 150° C. in an air-circulating oven to remove any volatiles, then cooled and catalyzed as shown in Table V. The catalyzed mixtures were molded and tested as in Example 1 with results as shown in Table V. The samples were post cured for 4 hours at 200° C. before physical property tests. The results show the degree of polymerization of the oligomer and the useful properties of the cured silicone elastomer.

TABLE V

| Shear Level | Durometer Shore A | Tensile Strength MPa | Elongation percent | Polymer Molecular Weight |
|---|---|---|---|---|
| Catalyzed with 1 part 2,5-bis(tertiary-butylperoxy)-2,5-dimethylhexane | | | | |
| 5 | 34 | 4.48 | 270 | 167,000 |
| 6 | 35 | 5.24 | 320 | 164,000 |
| 7 | 34 | 4.55 | 275 | 177,000 |
| 8 | 34 | 5.62 | 300 | 182,000 |
| 9 | 31 | 5.99 | 340 | — |
| Catalyzed with 1 part 2,4-dichlorobenzoylperoxide, 50% active | | | | |
| 5 | 30 | 3.65 | 250 | — |
| 6 | 34 | 5.17 | 300 | — |
| 7 | 34 | 4.55 | 270 | — |
| 8 | 35 | 5.17 | 270 | — |
| 9 | 33 | 5.93 | 313 | — |

EXAMPLE 12

The effect of drying the polymer-filler premix was determined by placing a portion of each mixture of Example 11 (before polymerization) in a preheated dough mixer (150° C.) under a pressure of 13 to 26 kPa for 30 minutes. The mixer and contents were cooled to 25°–30° C., then the catalyst was added. After 10 minutes the polymerization was complete. The polymerized mixtures were then tested as in Example 11 with the results shown in Table VI. Using a drying step accelerated the rate of polymerization.

TABLE VI

| Shear Level | Durometer Shore A | Tensile Strength MPa | Elongation percent | Polymer Molecular Weight |
|---|---|---|---|---|
| Catalyzed with 1 part 2,5-bis(tertiary-butylperoxy)-2,5-dimethylhexane | | | | |
| 5 | 34 | 5.36 | 318 | 226,000 |
| 6 | 36 | 5.02 | 295 | 161,000 |
| Catalyzed with 1 part 2,4-dichlorobenzoylperoxide, 50% active | | | | |
| 5 | 36 | 5.48 | 295 | — |
| 6 | 36 | 3.67 | 268 | — |

EXAMPLE 13

A series of mixtures were prepared with different levels of magnesium oxide used to neutralize the polymerization catalyst.

The method described in Example 8 was repeated up to the point of neutralization. The mixture was divided into 60 g portions, then each portion was mixed with magnesium oxide on a 2-roll mill to neutralize it. The parts of magnesium oxide used per 100 parts of polymer in the mixture is shown in Table VII.

The Williams plasticity of each mixture was measured after neutralization and after an accelerated aging period of 3 hours at 150° C. in accordance with the procedure of ASTM D-926. The results are shown in Table VII.

Each mixture was evaluated for heat stability by heat aging for one week in an air-circulating oven at either 150° C. or 250° C. The results are shown in Table VII.

The results show that as the amount of magnesium oxide is increased, the weight loss at 250° C. increases.

TABLE VII

| MgO parts | Weight Loss, Percent | | Williams Plasticity | |
|---|---|---|---|---|
| | 1 Week/ 150° C. | 1 Week/250° C. | Initial | After 3 hours/150° C. |
| 0.14 | 2.36 | 18.9 | * | * |
| 0.27 | 2.03 | 17.8 | * | * |
| 0.55 | 2.42 | 23.6 | * | * |
| 0.80 | 2.45 | 30.8 | 0.185 | 0.221 |
| 1.4 | 2.42 | 33.1 | 0.173 | 0.218 |
| 1.6 | 2.43 | 38.9 | 0.178 | 0.212 |
| 2.3 | 2.18 | 39.6 | 0.169 | 0.228 |
| 5.0 | 2.22 | 46.9 | 0.150 | 0.213 |

*Doubtful measurement due to stiff character of base—base creped.

EXAMPLE 14

A polymer-filler mixture for use in preparing a room temperature vulcanizing sealant was prepared.

A planetary mixer was loaded with 3000 g of the polydimethylsiloxane of Example 1 and 300 g of the fumed silica of Example 11. The mixture was stirred for 20 minutes at slow speed, then 10 minutes at high speed to disperse the filler in the oligomer. Then 15 g of dodecylbenzene sulfonic acid diluted with 150 g of glacial acetic acid was added and the pressure in the mixer pot was reduced to approximately 8.0 kPa. Mixing at slow speed continued for 6 minutes, during which time polymerization took place, then the catalyst was neutralized by adding 3.75 g of sodium acetate dissolved in 42 g of glacial acetic acid.

The polymer-filler mixture was converted into a room temperature vulcanizing sealant by adding, in the substantial absence of moisture, 165 g of a mixture consisting of 100 parts by weight of a 50/50 mixture of ethyltriacetoxysilane and methyltriacetoxysilane and 0.5 part by weight of dibutyltin diacetate.

The catalyzed mixture was spread into a chase to form a sheet and exposed to the atmosphere for 7 days at 23° C., 50% RH to cure. The cured sample was tested as above with the results: durometer 26 Shore A, tensile strength 1.85 MPa, and elongation 370 percent illustrating the useful properties of the cured sealant.

EXAMPLE 15

A planetary mixer was loaded with 1210 g of a premix of 1100 g of the polydimethylsiloxane of Example 1 and 110 g of the fumed silica of Example 11 which had been mixed by making a preliminary mix, then passing the mixture through a colloid mill to thoroughly disperse the silica in the oligomer. The mixture was stirred for 2 minutes in the planetary mixer at slow speed, then 5.5 g of dodecylbenzene sulfonic acid was added with the mixer on high speed to aid dispersion. After 1 minute the speed was reduced and the polymerization continued for a total of 30 minutes at which time 2.64 g of ammonium hydroxide was added to neutralize the catalyst. After 10 minutes mixing, the material was removed from the mixer.

Using this polymer-filler mixture, three separate types of room temperature curing sealants were prepared and evaluated. In each case 150 g of the above polymer-filler mixture was placed in a sealant tube, then centrifuged to remove air. In sealant 1, 10.5 g of the catalyst mixture of Example 14 was then mixed into the mixture. In sealant 2, the cure system was 11.8 g of methyltri(ethylmethylketoximo)silane and 0.49 g of dibutyltindilaurate. In sealant 3, the cure system was 12 g of methyltrimethoxysilane and 3 g of diisopropoxybis(ethylacetoacetato)titanium. In each case, the crosslinker and catalyst were injected into the polymer-filler mixture in the absence of moisture, then thoroughly mixed. A sample was then withdrawn from the tube and formed into a sheet for test purposes. The sheets were exposed to air at 23° C. and 50% relative humidity for one week to cure. Each type of sealant cured properly to a useful product which gave cured properties as follows.

| Sealant | 1 | 2 | 3 |
|---|---|---|---|
| Sealant Type | Acetoxy | Oxime | Alkoxy |
| Durometer, Shore A | 41 | 47 | 43 |
| Tensile Strength, MPa | 1.50 | 1.81 | 1.75 |
| Elongation, percent | 120 | 94 | 106 |

EXAMPLE 16

A premix was prepared by mixing 1500 g of the polydimethylsiloxane of Example 1 and 150 g of the fumed silica of Example 11 in a planetary mixer for 10 minutes, then through a high intensity mixer which impinges a high velocity stream of the mixture against a vibrating knife edge to cause the material to be broken up into fine droplets. The material exited from the mixer as a water-thin fluid, then became jelly-like in 20 to 30 seconds.

The planetary mixer was loaded with 1500 g of the above premix, with stirring at slow speed for 20 minutes, at which time 8.86 g of dodecylbenzene sulfonic acid was added and mixing continued for 30 minutes. After the 30 minute polymerization time, the catalyst was neutralized by mixing in 8.4 ml of diethylamine. After 10 minutes, the product was removed from the mixer.

The above product was mixed with two different types of curing systems for room temperature vulcanizing sealants that cure upon exposure to moisture. The procedure used was as in Example 15. These were evaluated for physical properties after curing. The properties obtained were:

| Sealant | 4 | 5 |
|---|---|---|
| Sealant type | Oxime | Acetoxy |
| Durometer, Shore A | 21 | 21 |
| Tensile Strength, MPa | 1.81 | 1.89 |
| Elongation, percent | 466 | 476 |

The cured products have useful properties.

EXAMPLE 17

A series of polymerizations were run to show the effect of including an endblocking material in the oligomer-filler mixture during polymerization.

An oligomer-filler mixture was prepared by mixing 3300 g of hydroxyl-endblocked polydimethylsiloxane of Example 1 with 330 g of fumed silica having a surface area of 200 m²/g. The materials were mixed together by rolling in a container for 1 hour, allowing to sit for 72 hours, then passing through a colloid mill to give a uniform grease-like dispersion of the fumed silica in the oligomer.

Then 550 g portions (500 g of oligomer with 50 g of dispersed fumed silica) were weighed out. A series of endblocker-catalyst mixtures were prepared by mixing 3.25 g of dodecylbenzene sulfonic acid with the amounts of tetramethyldivinyldisiloxane endblocking material shown in Table VIII. The polymerization was carried out by mixing the endblocker-catalyst mixture into the oligomer-filler mixture in a heavy-duty kitchen type mixer at room temperature. Mixing continued for 30 minutes to polymerize, then the catalyst was inactivated by mixing in 3.08 ml of diethylamine.

The silicone polymer-filler mixtures were evaluated by measuring their extrusion rate through a ⅛" diameter hole under 90 p.s.i. air pressure.

Several of the mixtures were then mixed with a curing agent to give a composition stable in the absence of moisture, but curable on exposure to moisture by the following procedure. Sealant tubes were loaded with 120 g of the silicone polymer-filler mixture, centrifuged to remove air, then placed in a vacuum oven under reduced pressure for 2½ hours to remove air and moisture, then each was recentrifuged. Each tube was then catalyzed by mixing with 6 g of a 50/50 mixture by weight of methyltriacetoxysilane and ethyltriacetoxysilane which contained 0.5 percent by weight dibutyltindiacetate, mixing under essentially anhydrous conditions.

Each catalyzed mixture was then evaluated for suitability as a caulking material by measuring the degree of flow or slump according to ASTM D-2202. Each mixture was formed into a sheet and exposed to air to cure it. The mixture with no endblocker cured in less than 24 hours. The mixture with the highest amount of endblocker had only started to cure at that time. The samples were tested for physical properties after curing at room temperature for 20 days. The test results shown in Table VIII illustrate that the amount of endblocking material used effects the properties of the sealant produced.

TABLE VIII

| End-blocker grams | Slump mm | Extrusion Rate g/min. | Durometer Shore A | Tensile Strength MPa | Elongation percent | Modulus, 100% MPa |
|---|---|---|---|---|---|---|
| 0 | 0.0 | 164 | 30 | 2.23 | 286 | 0.81 |
| 1.14 | — | 80 | — | — | — | — |
| 2.27 | — | 154 | — | — | — | — |
| 3.41 | 0.0 | 270 | 19 | 1.35 | 308 | 0.45 |
| 4.55 | — | 384 | — | — | — | — |
| 5.69 | 4.8 | 360 | 13 | 1.41 | 405 | 0.34 |
| 11.38 | 6.4 | 1248 | 10 | 1.07 | 383 | 0.28 |
| 22.76 | 133 | 2130 | 2 | 0.72 | 456 | 0.17 |

EXAMPLE 18

A curable composition was prepared which cured through a reaction between an unsaturated radical on silicon and a hydrogen atom on silicon.

An endblocker-catalyst mixture was prepared as in Example 17 by mixing 3.25 g of dodecylbenzene sulfonic acid with 28.45 g of tetramethyldivinyldisiloxane. The endblocking material supplied the unsaturated radical on silicon. This mixture was then combined with 550 g of the oligomer-filler mixture of Example 17 as in Example 17, mixed for 45 minutes to polymerize, then inactivated by admixing 3.08 g of diethylamine.

A 120 g portion of the above silicone polymer-filler mixture was calculated to contain 1.70 g of vinyl radical or 0.063 moles. A trimethylsiloxy endblocked polysiloxane having an average of five methylhydrogensiloxane units and three dimethylsiloxane units was used as a crosslinker. In order to supply 1.5 moles of hydrogen atom per mole of vinyl radical, 13 g of the crosslinker was mixed into the silicone polymer-filler mixture. The mixture was then catalyzed with 6 drops of a solution containing 0.85 percent of platinum. This formulated mixture was placed in a vacuum oven for 10 minutes to remove air, then was formed into a sheet and cured for 16 hours at room temperature, then 5 minutes at 150° C. The sheet was cut into test pieces and the following properties were measured, showing the usefulness of the cured silicone polymer-filler mixture.

| Durometer, Shore A | 16 |
|---|---|
| Tensile Strength, MPa | 1.26 |
| Elongation, percent | 243 |
| 100% Modulus, MPa | 0.37 |

That which is claimed is:

1. A method of producing a non-crepeing silicone polymer-filler mixture by bulk polymerization comprising
  (A) mixing
    (i) 100 parts by weight of polydiorganosiloxane (a) of the formula $HO(R_2SiO)_xH$, wherein each R is a radical selected from the group consisting of methyl, ethyl, propyl, phenyl, vinyl, allyl, and 3,3,3-trifluoropropyl, and x is an average value in the range of from 3 to 100 inclusive; optionally (i) can have present siloxane selected from the group consisting of polydiorganosiloxane (c) of the formula $R_3'SiO(R_2SiO)_zSiR_3'$, polydiorganosiloxane (d) of the formula $R_3'SiO(R_2SiO)_zH$, and mixtures thereof wherein each R is as defined above, each R' is a monovalent hydrocarbon radical of 6 or less carbon atoms, and z is an average value in the range of from 0 to 50 inclusive;
    (ii) from 2 to 70 parts by weight of reinforcing filler, said filler being acidic or neutral; and
    (iii) a catalytic amount of sulfuric acid or a sulfonic acid of the formula $XSO_3H$, wherein X is selected from the group consisting of halogen, alkyl, aryl, alkoxy, and alkaryl radicals,
  (B) allowing polymerization to take place, and
  (C) inactivating the catalyst with a Lewis base to produce a non-crepeing dispersion of reinforcing filler in a polydiorganosiloxane having a higher molecular weight than the starting material in (i).

2. The method of claim 1 in which (i) and (ii) are mixed together using sufficient shear to cause dispersion of (ii) in (i) before the addition of (iii).

3. The method of claim 1 in which (i) includes either polydiorganosiloxane (c), polydiorganosiloxane (d), or both.

4. The method of claim 2 in which (ii) is colloidal silica, and (iii) is a monoalkyl substituted benzene sulfonic acid of the formula $R^2C_6H_4SO_3H$ wherein $R^2$ is a monovalent hydrocarbon radical of at least 6 carbon atoms.

5. The method of claim 1 in which x is from 10 to 100 inclusive, (ii) is fumed silica in an amount of from 20 to 60 parts by weight having a specific surface area of from 175 m²/g to 300 m²/g, (iii) is monoalkyl substituted benzene sulfonic acid, and the catalyst is inactivated with magnesium oxide.

6. The method of claim 1 in which (i) and (ii) are mixed, then subjected to a water removal step before the addition of (iii) and step (B) also includes a means for removal of water.

7. The method of claim 1 in which the dispersion of reinforcing filler in polydiorganosiloxane is further mixed with curing agent to yield a curable composition.

8. The method of claim 7 in which the curing agent is an organic peroxide suitable for curing silicone elastomer.

9. The method of claim 7 in which the curing agent yields a composition stable in the absence of moisture which cures to silicone elastomer upon exposure to moisture.

10. The product obtained by the method of claim 1.
11. The product obtained by the method of claim 5.
12. The product obtained by the method of claim 6.
13. The curable product obtained by the method of claim 7.
14. The curable product obtained by the method of claim 9.

15. A method of producing a non-crepeing silicone polymer-filler mixture by bulk polymerization comprising
  (A) mixing together (i) and (ii) using sufficient shear to cause dispersion of (ii) in (i) before (iii) is added,
    (i) 100 parts by weight of polydiorganosiloxane (a) of the formula $HO(R_2SiO)_xH$, wherein each R is a radical selected from the group consisting of methyl, ethyl, propyl, phenyl, vinyl, allyl, and 3,3,3-trifluoropropyl, and x is an average value in the range of from 3 to 100 inclusive;
    (ii) from 5 to 20 parts by weight of fumed silica filler having a surface area of from 175 m²/g to 300 m²/g, and
    (iii) from 0.5 to 0.7 part by weight of dodecylbenzene sulfonic acid
  (B) allowing polymerization to take place, and
  (C) inactivating the catalyst with from 0.3 to 0.5 of diethylamine to produce a non-crepeing dispersion of reinforcing filler in a polydiorganosiloxane having a higher molecular weight than the starting material in (i).

16. The product obtained by the method of claim 15.

17. A method of producing a non-crepeing silicone polymer-filler mixture by bulk polymerization comprising
  (A) mixing
    (i) 100 parts by weight of polydiorganosiloxane (a) of the formula $HO(R_2SiO)_xH$, wherein each R is a radical selected from the group consisting of methyl, ethyl, propyl, phenyl, vinyl, allyl, and 3,3,3-trifluoropropyl, and x is an average value in the range of from 10 to 100 inclusive; optionally (i) can have present siloxane selected from the group consisting of polydiorganosiloxane (c) of the formula $$R_3'SiO(R_2SiO)_zSiR_3',$$

polydiorganosiloxane (d) of the formula $$R_3'SiO(R_2SiO)_zH,$$

and mixtures thereof wherein each R is as defined above, each R' is a monovalent hydrocarbon radical of 6 or less carbon atoms, and z is an average value in the range of from 0 to 50 inclusive;

(ii) from 2 to 70 parts by weight of reinforcing colloidal silica filler, said filler being acidic or neutral; and (iii) a catalytic amount of monoalkyl substituted benzene sulfonic acid, (B) allowing polymerization to take place, and (C) inactivating the catalyst with a Lewis base to produce a non-crepeing dispersion of reinforcing filler in a polydiorganosiloxane having a higher molecular weight than the starting material in (i).

18. The product obtained by the method of claim 17.

19. A method of producing a non-crepeing silicone polymer-filler mixture by bulk polymerization comprising (A) mixing (i) 100 parts by weight of polydiorganosiloxane (a) of the formula $$HO(R_2SiO)_xH,$$

wherein each R is a radical selected from the group consisting of methyl, ethyl, propyl, phenyl, vinyl, allyl, and 3,3,3-trifluoropropyl, and x is an average value in the range of from 3 to 100 inclusive, and (ii) from 2 to 70 parts by weight of reinforcing colloidal silica filler using sufficient shear to cause dispersion of (ii) in (i), then heating the resulting mixture in a closed container to a temperature of from 100° C. to 170° C. while removing water from the system, for a time sufficient to remove water, then cooling the resulting dry minute to a temperature of from 80° C. to 100° C., then admixing (iii) from 0.5 to 1.0 part by weight of dodecylbenzene sulfonic acid, (B) allowing polymerization to take place by cooling the catalyzed mixture to a temperature in the range of from 30° C. to 35° C. and holding at temperature for a period of greater than 15 minutes until the desired increase in molecular weight is reached, and (C) inactivating the catalyst by admixing from 0.4 to 1.4 parts by weight of calcined magnesium oxide to produce a non-crepeing dispersion of reinforcing filler in a polydiorganosiloxane having a higher molecular weight than the starting material in (i).

20. The product obtained by the method of claim 19.

21. A method of producing a non-crepeing silicone polymer-filler mixture by bulk polymerization comprising (A) mixing (i) 100 parts by weight of polydiorganosiloxane (a) of the formula $$HO(R_2SiO)_xH,$$

wherein each R is a radical selected from the group consisting of methyl, ethyl, propyl, phenyl, vinyl, allyl, and 3,3,3-trifluoropropyl, and x is an average value in the range of from 10 to 100 inclusive;

(ii) from 2 to 70 parts by weight of reinforcing filler, said filler being acidic or neutral; and (iii) a catalytic amount of sulfuric acid or a sulfonic acid of the formula $XSO_3H$, wherein X is selected from the group consisting of halogen, alkyl, aryl, alkoxy, and alkaryl radicals, (B) allowing polymerization to take place, and (C) inactivating the catalyst with a Lewis base to produce a non-crepeing dispersion of reinforcing filler in a polydiorganosiloxane having a higher molecular weight than the starting material in (i).

* * * * *